Oct. 21, 1969          R. C. WHITE ET AL          3,473,791
                         PICKLING APPARATUS
Filed Feb. 20, 1968                          5 Sheets-Sheet 1

INVENTORS
Ralph C. White and
Robert N. Christian.
BY
        THEIR ATTORNEYS

INVENTORS
Ralph C. White and
Robert N. Christian.
BY
THEIR ATTORNEYS

INVENTORS
Ralph C. White and
Robert N. Christian.
BY
THEIR ATTORNEYS

Oct. 21, 1969  R. C. WHITE ET AL  3,473,791
PICKLING APPARATUS
Filed Feb. 20, 1968  5 Sheets-Sheet 5
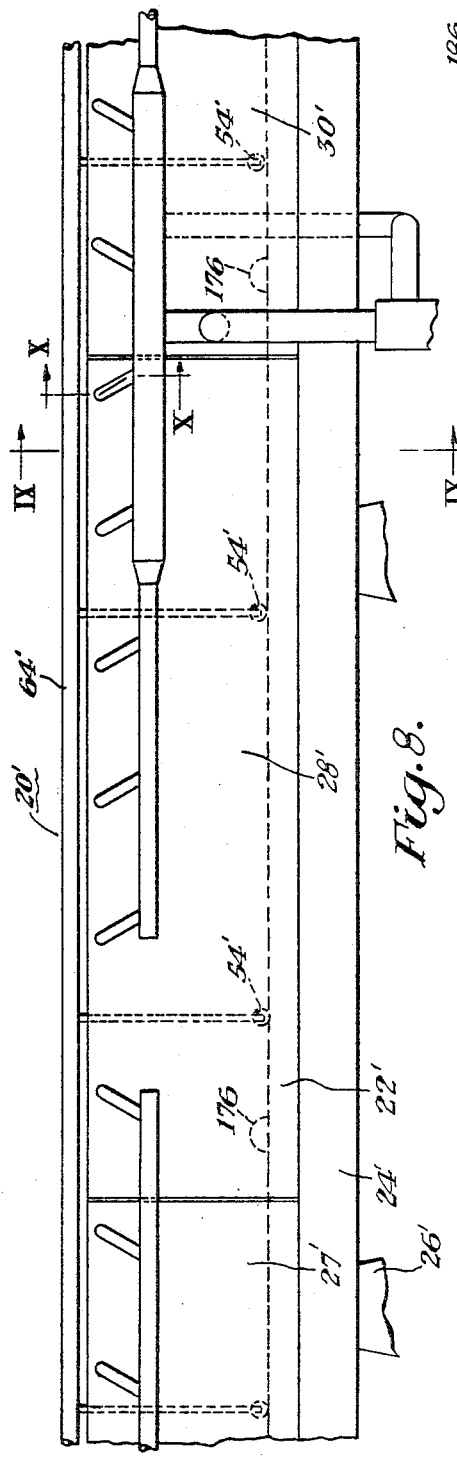
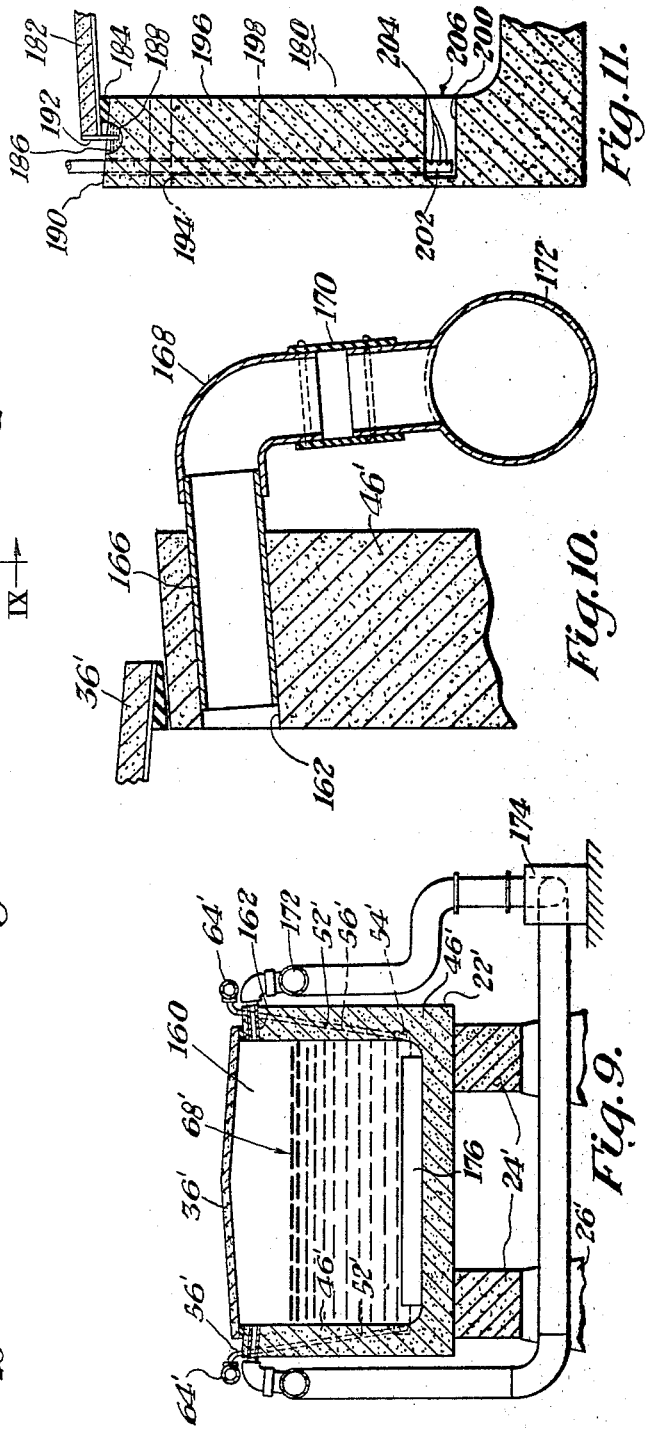
INVENTORS
*Ralph C. White and
Robert N. Christian.*
BY
THEIR ATTORNEYS United States Patent Office 3,473,791
Patented Oct. 21, 1969

3,473,791
PICKLING APPARATUS
Ralph C. White, Bethel Park, and Robert N. Christian, McMurray, Pa., assignors to The Bushnell Machinery Co., Pittsburgh, Pa., a corporation of Pennsylvania
Filed Feb. 20, 1968, Ser. No. 706,823
Int. Cl. B08b 9/08
U.S. Cl. 261—124
22 Claims

ABSTRACT OF THE DISCLOSURE

A tank and associated apparatus are disclosed for use in a corrosive environment such as encountered in pickling operations. When employed with pickling solutions such as hydrochloric or sulfuric acid, the tank and associated supporting structures are fabricated in a novel manner and completely from granite. A unique steam sparging system is disclosed for heating the solution contained in the tank, which obviates the use of tubes or other means extending into the tank interior. Novel means are also disclosed for covering, ventilating and sealing the tank.

---

The present invention relates to pickling apparatus and more particularly to novel apparatus for applying heat to the tanks containing pickling solution, acid resistant means for fabricating, supporting, and covering the pickling tanks, and means for extracting the noxious fumes normally associated with the pickling solution.

In various pickling arrangements, steel strip or the like is immersed in a pickling solution, such as relatively dilute sulfuric acid ($H_2SO_4$) or hydrochloric acid (HCl). Both batch and continuous pickling lines are in use at the present time. Usually, it is desired to heat the pickling bath; for example, a 25% solution of $H_2SO_4$ or a 7–10% solution of HCl may be maintained at temperatures of 205° F. and 190° F., respectively, in typical applications.

In pickling operations, particularly in continuous processes, it has always been a problem to maintain the pickling solution at the proper temperature. Previously it has been the practice to insert heating implements such as steam spargers directly into the interior of pickling tanks for heating the contained solution. The spargers or other heating elements generally have been inserted adjacent the inner walls of the pickling tanks where they may interfere with the movement of the steel strip or the like, the strip lifters, and the protective covers and/or ventilating hoods for the tanks. In addition to these operational difficulties, the inserted heating elements frequently damage the edges of the strip material and are damaged in return by contact with the strip.

Although our invention is described primarily in connection with pickling apparatus, it will be obvious that our novel structures have other uses, particularly in corrosive environments.

Pickling tanks have been constructed from various types of materials selected or treated for acid resistance. In the past, rubber or glass-lined steel tanks, hard rubber tanks, and masonry tanks have been employed. Masonry tanks are undesirable because the joints among the bricks or blocks thereof are subject to attack by the pickling solution. Lined steel tanks are disadvantageous as both inner and outer surfaces must be coated with acid resistant materials, and, of course, inadvertent rupture of the coatings exposes the steel to attack. The use of hard rubber, although resistant to most pickling solutions, limits the size of the pickling tank.

Pickling tanks for many purposes have been fabricated from granite, which is resistant to most pickling solutions. Granite tanks have been difficult to heat, cover and ventilate properly for the reasons advanced previously, and because of their considerable size and weight.

The heavy, granite tanks are difficult to support properly without the use of steel or concrete structures, both of which are attacked by most pickling acids. The use of concrete or steel support structures is precarious at best, as inadvertent acid spillage may weaken portions of the structures. Providing a proper acid resistant coating for the supporting structures is not only difficult and time consuming, but also inadvertent coating ruptures or other failures may escape inspection and lead to unsuspected weakening of the support structures.

We overcome these disadvantages of the prior art by providing a pickling tank structure in which the cover supports, the tank itself, external supporting structures for the tank, their internal weirs if used, end plates, and the bottom ribs if used are fabricated entirely from granite. Our novel tank construction is adaptable for either continuous or batch pickling processes, and in this connection the granite tank can be supplied as a single unit or as a series of interconnected modules which are especially useful in continuous pickling. The tank or series of tank modules are supported on reinforced granite beams, of novel construction, extending along the length of the tank or modules and supported in bridging fashion upon granite piers. We provide novel means for heating, ventilating, draining and covering our novel construction all of which eliminates the need for internal projections of any kind within the tank. Our novel tank construction and support therefor, together with the heating, ventilating and cover supporting means, are completely impervious to corrosion by pickling solutions employed within the tank.

We accomplish these desirable results by providing apparatus for pickling and the like, said apparatus comprising a heavy-walled tank having side and bottom walls, said tank being fabricated from granite, an end closure fabricated from granite for each end of said tank, each of said closures having an integral buttress member secured thereto and protruding into the adjacent end portion of said tank, said closure and said buttress being sealed to the adjacent surfaces of said tank.

We also desirably provide apparatus for pickling and the like, said apparatus comprising a heavily constructed tank having side and bottom walls, a plurality of sparger passages extending along the height of at least one of said side walls and opening at their upper ends adjacent the top portion of said one side wall and at their lower ends into enlarged recesses respectively formed on the inner surface of said one side wall adjacent said bottom wall, a plurality of sparger tubes inserted respectively into said sparger passages, said tubes protruding from the upper end of said passages, means for supplying a heating fluid to the upper end of said sparger tubes, and the lower ends of said tubes opening into said wall recesses for supplying quantities of said heating fluid to a pickling solution within said tank.

We also desirably provide apparatus for pickling and the like, said apparatus comprising a heavy-walled tank having side and bottom walls, cover means for said tank, railing means spacedly supported on the upper edge portion of at least one of said side walls, and ventilating hood means having inlet means inserted into said space and extending substantially along the length of said railing means.

We also desirably provide apparatus for pickling and the like, said apparatus comprising a heavy-walled tank having side and bottom walls, at least one of said side walls having an outwardly facing and longitudinally extending offset adjacent the top edge thereof, cover means for said tank supportable on an extension formed by said offset and on the upper edge portion of the other of said walls, a plurality of vent passages extending through said extension adjacent the bottom surface of said offset, and ventilating means coupled to said vent passages for removing fumes of a pickling solution and the like when contained within said tank.

We also desirably provide apparatus for pickling and the like, said apparatus comprising an elongated heavy-walled tank, means for supporting said tank, means for covering said tank, means for ventilating said tank, and a sparging system for heating a pickling solution contained within said tank, said sparging system including a plurality of sparging passages bored generally along the height of the side walls of said tank, each of said passages opening at one end adjacent the upper edge of the associated side wall and at its lower end into a relatively larger recess formed in the inner surface of said associated wall adjacent the bottom of said tank and a like number of sparger tubes inserted respectively into said passages, said tubes protruding respectively into said recesses and having at least one opening therein disposed adjacent the lower end thereof and communicating directly with said recesses, and means coupled to the upper ends of said sparger tubes for conducting a heating fluid thereto.

We also desirably provide a beam fabricated from granite and the like and capable of supporting a relatively heavy beam loading in a corrosive environment, said beam structure comprising an elongated member having at least one longitudinal passage bored therethrough adjacent the bottom surface thereof, a tension rod or cable extending through said passage, and stop means rigidly secured to said rod or cable and bearingly engaging said member adjacent the ends of said passage to preserve the tension in said rod or cable.

During the foregoing discussion, various objects, features and advantages of the invention have been set forth. These and other objects, features and advantages of the invention together with structural details thereof will be elaborated upon during the forthcoming description of certain presently preferred embodiments of the invention and presently preferred methods of practicing the same.

In the accompanying drawings we have shown certain presently preferred embodiments of the invention and have illustrated certain presently preferred methods of practicing the same wherein:

FIGURE 8 is a partial side-elevational view of still another modification of our novel pickling apparatus;

FIGURE 9 is a cross-sectional view of the apparatus as shown in FIGURE 8 and taken along reference line IX—IX thereof;

FIGURE 10 is an enlarged partial cross-sectional view of the apparatus as shown in FIGURE 8 and taken along reference line X—X thereof; and FIGURE 11 is a partial cross-sectional view of our apparatus, similar to that shown in the preceding figures, but showing a modified sealing arrangement for the tank cover, together with a modified sparger passage.

Figure 1:
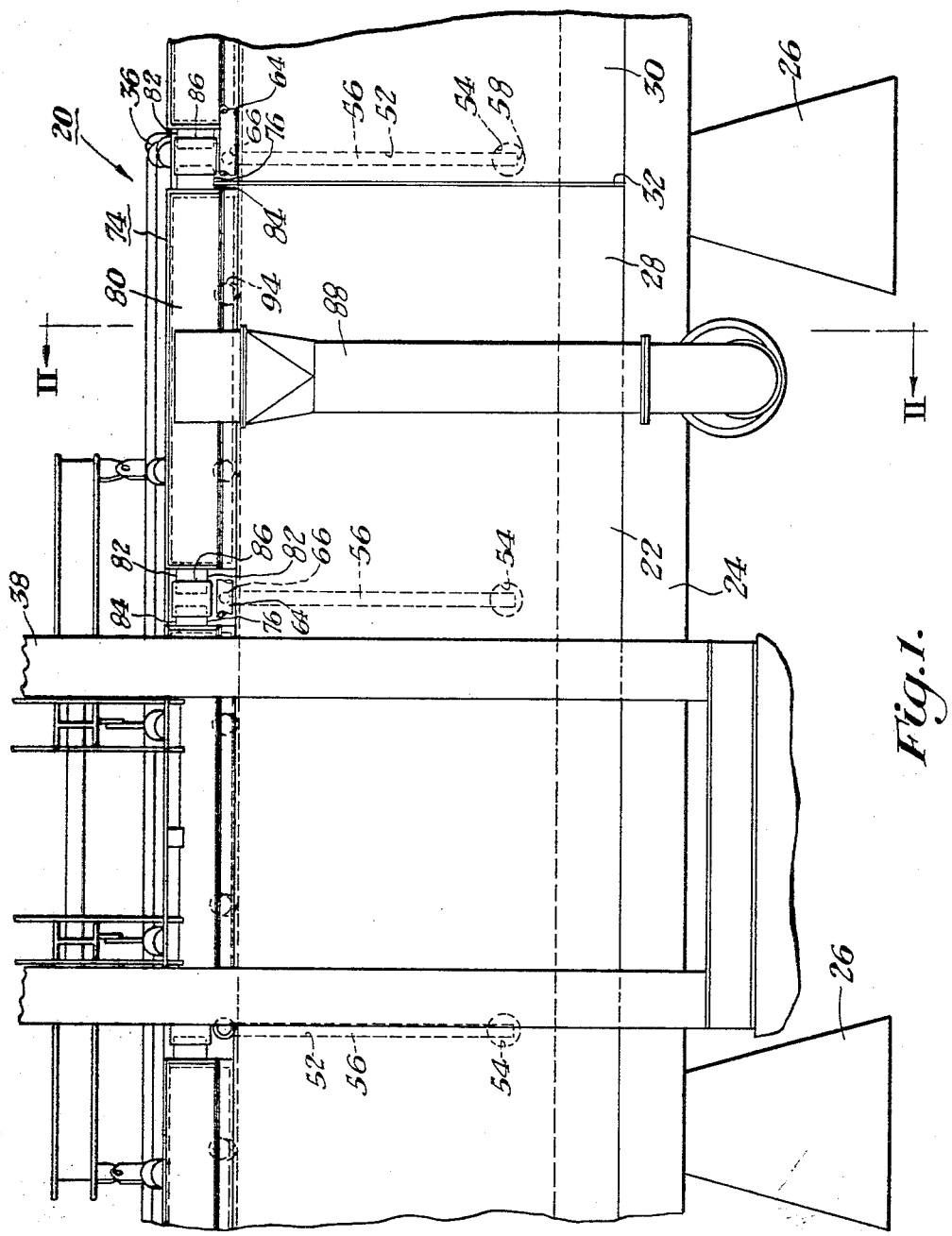
FIGURE 1 is an elevational view of one form of our novel pickling apparatus, with parts thereof being broken away.
Figure 2:
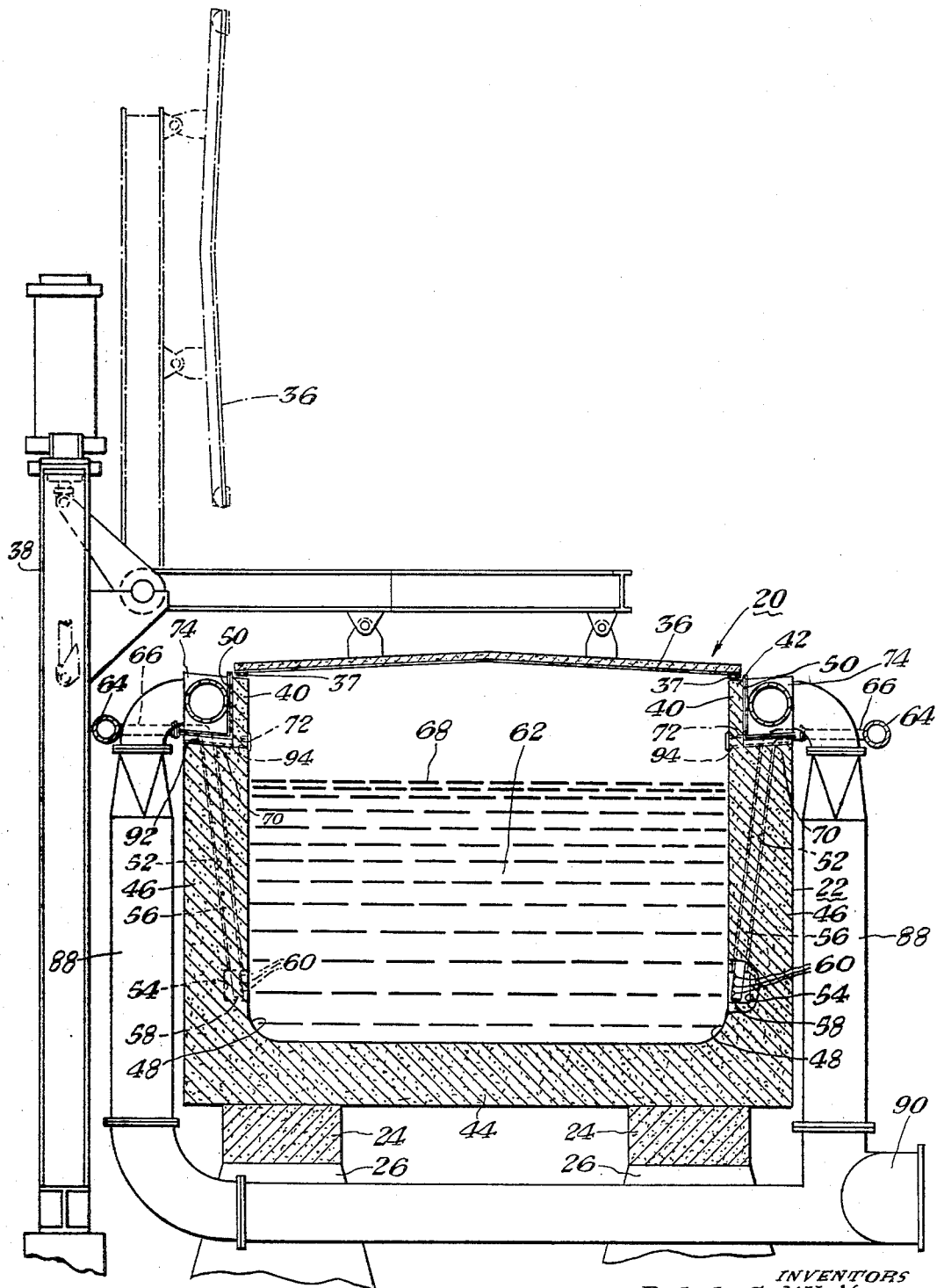
FIGURE 2 is a cross-sectional view of the apparatus as shown in FIGURE 1 and taken along reference line II—II thereof.

Referring now with greater particularity to FIGURES 1 and 2 of the drawings, our novel pickling apparatus 20 shown therein comprises an elongated granite tank 22 supported on reinforced granite beams 24 and spaced buttresses or piers 26. If desired the tank 22 can be provided in the form of a number of discreet modules such as the modules 28 and 30. The modules can be packed and sealed at their one or more junctions 32 by a closed cell, foamed rod of polyethylene and by a known silicone sealant and the like.

The tank construction 22 is provided with one or more covers 36, each of which, if more than one, is manipulated by a cover lifter 38. As the lifter 38 is of conventional construction, it will not be described in detail. Each of the covers 36 is provided with a peripheral strip 38 of relatively soft foam material, such as foamed polypropylene, for the purpose of sealing the cover to the upstanding wall projections 40 of the tank construction 22 and an adjacent cover if more than one such cover 36 is used. The upper edges 42 of the wall projections 40 are inclined inwardly of the tank construction 22 for drainage into the tank of pickling solution conveyed to the wall edges in order to prevent leakage at the cover portions resting thereon.

When the tank construction 22 is employed in a continuous pickling line, it can be provided with weir caps and internal buttresses fabricated in accordance with the invention and with bottom spacers or ribs all of which are described in connection wtih subsequent figures. Within the tank and at junctions between the bottom wall 44 and side walls 46 fillets 48 are respectively provided for stress reduction at the junctions.

As evident from FIGURE 1 the reinforced granite beams 24 desirably extend longitudinally along the entire length of the tank construction 22. Each of the piers 26 is likewise fabricated from a single block of granite of suitable height and shape as dictated by a given installation. The construction of the granite beams 24 is elaborated on below in connection with FIGURES 4 and 7 of the drawings. Although two such beams 24 are illustrated, it is intended that a different number can be used or determined by the weight of the tank 22 and the spacing of the piers 26.

To accommodate our novel ventilational system described below the upper outer surface of each of the tank walls 46 is offset at 50, with the offsets 50 formulating the wall projections 40 described above. From the notches 50 a series of inclined but generally upstanding passages 52 are drilled or otherwise formed in the tank side walls 46 and extend substantially along the height thereof. These passages 52 are spaced, desirably at repetitive intervals, along the length of the tank construction 22 as better shown in FIGURE 1. Each of the inclined passages 52 communicates at its lower end wth a widened recess 54 formed adjacent the bottom tank wall 44 in the inner wall surface of the side walls 46 and communicating with the interior of the tank construction 22.

A sparger tube 56 for steam or other heated fluid is inserted through each of the passages 52 such that the lower end portion 58 extends into the associated recess 54. The lower end portion 58 of each sparger tube 56 is provided with one or more perforations or openings 60 for the exit of heating fluid directly into the pickling solution 62 contained within the tank construction 22. It will be appreciated that the sparger tubes 56 can be spaced along the tank construction 22 with greater or less frequency than that indicated in FIGURE 1 depending upon the total quantity of heat which must be added to the pickling solution 62.

A steam header or the like 64 is coupled through connecting conduits 66 to the upper ends of the sparger tubes 56 associated with each side wall 46. It will be understood that the level 68 of the pickling solution 62 is restored within the tank construction 22 such that pickling solution will not exit from the upper ends 70 of the sparger passages 52 nor enter the vent passages 72 described below.

The space between the cover 36 and the surface 68 of the pickling solution 62 is ventilated in order to draw off unavoidable and toxic fumes. This is accomplished through series of vent passages 72 extending through the base portions of the wall extensions 40 and opening into the offsets 50. A vent conduit 74 desirably coextends with each of the offsets 50 and can be sealed into the associated offset 50 with the aforementioned sealing material. The conduit 74 is equipped with series of inlet openings disposed for communication respectively with each of the vent passages 72. Each conduit 74 desirably is provided with reduced sections 76 to provide clearance for the sparger tubes 56 or their connecting conduits 66, as better shown in FIGURE 1 of the drawings. In furtherance of this purpose, each conduit 74 desirably is provided in the form of tandemly arranged sections 80, the ports 82, 84 of which are slip-fitted into connecting collars 86.

Each of the vent conduits or manifolds 74 is coupled to one or more downcomers 88 which in turn are joined to vent header 90 as better shown in FIGURE 2. Desirably the bottom surfaces 92 of the offsets 50 are also slanted inwardly of the tank construction 22 so that spillage or condensation of the pickling solution will drain back into the tank construction 22 through the vent passages 72 or through the sparger passages 52.

Desirably the cover 36, the sparger tubes 52, vent tubes 94 extending respectively through the vent passages and the manifold 74 and duct work associated therewith are fabricated from an acid resistant material such as polypropylene or from fiber glass reinforced polypropylene coated with polypropylene or the like. Other suitable materials for these components include monel metal lined or coated with Teflon or the like. Teflon is a trademark owned by DuPont for a polytetrafluoroethylene.

In FIGURES 3 to 7 of the drawings another form of our novel pickling apparatus 20' is illustrated. The latter figures illustrate a modification of our novel heating, ventilating and cover supporting means together with details of our novel supporting structure, weir structure, and one piece tank end construction suitable for use with any of our disclosed modifications of pickling apparatus.

In the arrangement of FIGURES 3 to 7, the cover 36 is supported in another unique fashion. The cover itself can be lifted by a crane (not shown) and lifting hooks 96, or alternatively can be supported by means of the lifter 38 (FIGURES 1 and 2).

In this example, the cover 36' is apertured for passage of one or more strip lifter bars 98 which are turned and raised and lowered by means of a conventional strip lifter 100. The construction and operation of the strip lifters 100 are known and will not be described in detail. Suffice it to say, however, that similar strip lifters 100 can be provided in the embodiments of our invention shown in FIGURES 1, 2 and in FIGURES 8–10.

In this arrangement, the one or more covers 36' are supported upon elongated granite railings 102 which in turn are spacedly mounted on the top surfaces of the tank walls 46' by means of a number of pins 104 and apertured granite spacers 105. The pins 104 are supported in recesses 106 and 108 therefor in the tank walls 56' and in the railings 102 respectively. The pins are inserted through the spacer blocks 105, which are spaced along the length of the railings 102 to maintain a uniform width of the gaps or spaces 110. The recesses 106, 108 are of sufficient depth to accommodate the pins 104 without the application of loading forces. In this example, the pins 104 are fabricated from a hard rubber which is resistant to the corrosive action of the pickling solution 62'.

Figure 3:
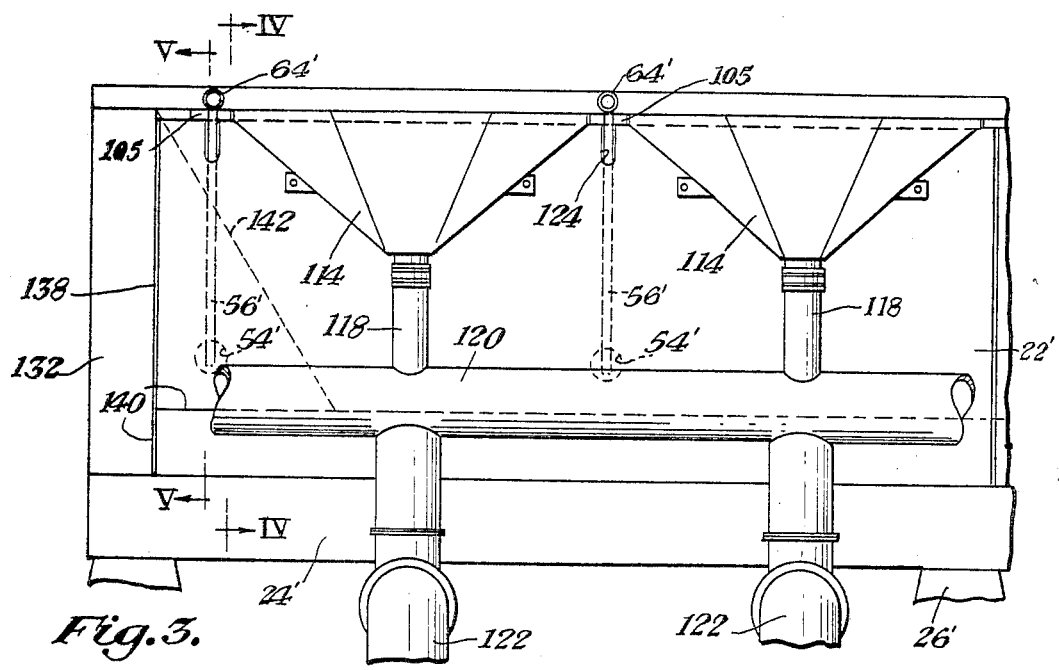
FIGURE 3 is an elevational view, partially broken away, of a modified form of our novel pickling apparatus.

As better shown in FIGURE 3, the ventilating means includes one or more vent hoods 114 for the one or more elongated spaces or gaps 110 between adjacent spacers blocks 112. Each of the hoods 114 is provided with elongated and narrow inlet means 116 which is insertable into the associated gap 110 and which extends into closely fitted engagement with the spacing blocks 112 on either side thereof. Each hood 114 is further provided with a downcomer 118 for connection to manifold 120. As better shown in FIGURE 4 the manifolds 120 can be connected, if desired, to a common header 122 which in turn is coupled to a suitable blower or the like (not shown).

In the arrangement of the invention of FIGURES 3 to 7, the sparger passages 52' terminate at their upper ends upon the outer wall surface of the tank walls 46'. The elongated upper openings 124 of the sparger passages 52' are disposed so that they are entirely above the pickling solution 68' as evident from FIGURE 4 of the drawings. The spargers 56', sparger passages 52', and the remainder of the sparging system is otherwise constructed substantially as described in connection with FIGURES 1 and 2 of the drawings.

The tank construction 22' can be provided with one or more weirs 126 spaced therealong to prevent the steel strip or other material being pickled from dragging upon the bottom wall 44' of the tank construction. Each weir 126 includes a buttress block as better shown in FIGURE 6 preferably fabricated in one piece construction from granite. In cross-sectional configuration the block 128 is trapezoidal while its lower end portions 130 are rounded, as better shown in FIGURE 4, to conform to the rounded tank fillets 48'. The buttress block 128 is provided with a removable granite weir cap 132 for contact with the moving strip. After a predetermined amount of wearing the weir cap 132 can be removed for reshaping or replacement.

Figure 5:
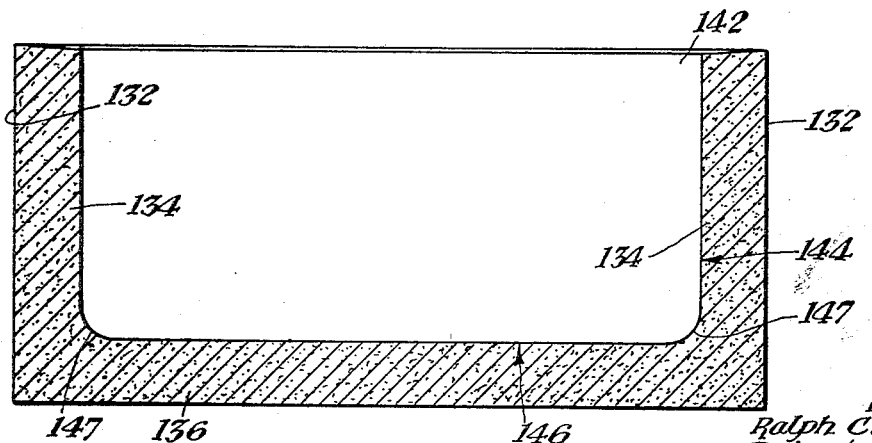
FIGURE 5 is another cross-sectional view of the apparatus as shown in FIGURE 3 and taken along reference line V—V thereof.

As better shown in FIGURES 3 and 5 of the drawings each end of the tank construction 22' can be closed by a one piece end plate 132. The side and bottom portions 134 and 136, respectively, of the end plate 132 are sealed to the adjacent end surfaces of the side and bottom walls 46', 44' of the tank construction 22'. The side and bottom junctions 138, 140 are packed with the silicone sealant and closed cell polyethylene rod mentioned above. In furtherance of this purpose, the end plate 132 desirably is provided with an integral buttress member 142 of triangular cross-sectional configuration as better shown in FIGURE 3. The side and bottom surfaces 144, 146 respectively of the buttress member 142 are similarly sealed to the adjacent inner surfaces of the side and bottom tank walls 46', 44'. The bottom edge portions 147 of the end plate buttress 142 are rounded in order to provide a complementary fit with the fillets 48' of the tank construction 22'. A similar closure 132 can be provided at the other end of the tank construction 22'.

Figure 7:
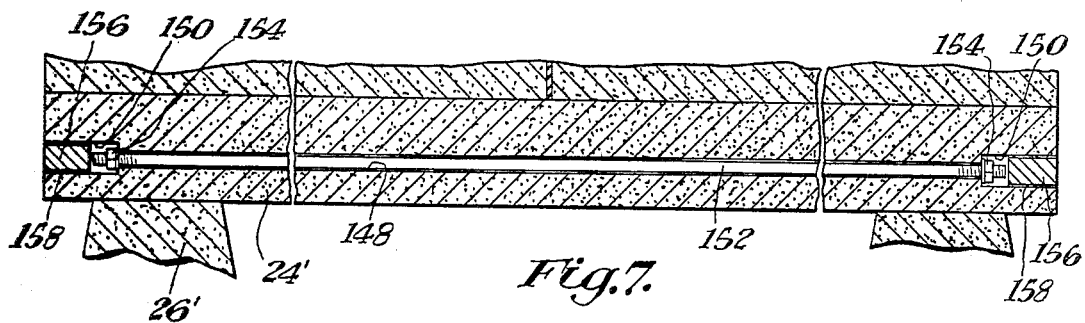
FIGURE 7 is another partial, longitudinally section view of the apparatus as shown in FIGURE 4 and taken along reference line VII—VII thereof.
Figure 6:
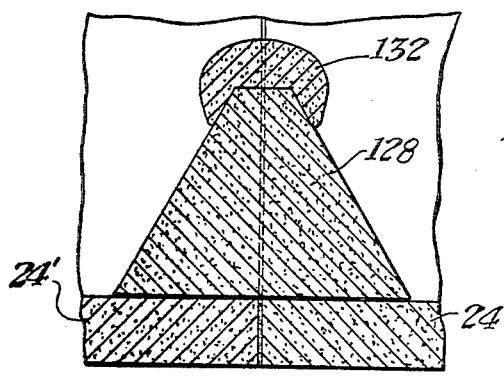
FIGURE 6 is a partial, longitudinally section view of the apparatus as shown in FIGURE 4 and taken along reference line VI—VI thereof.
Figure 4:
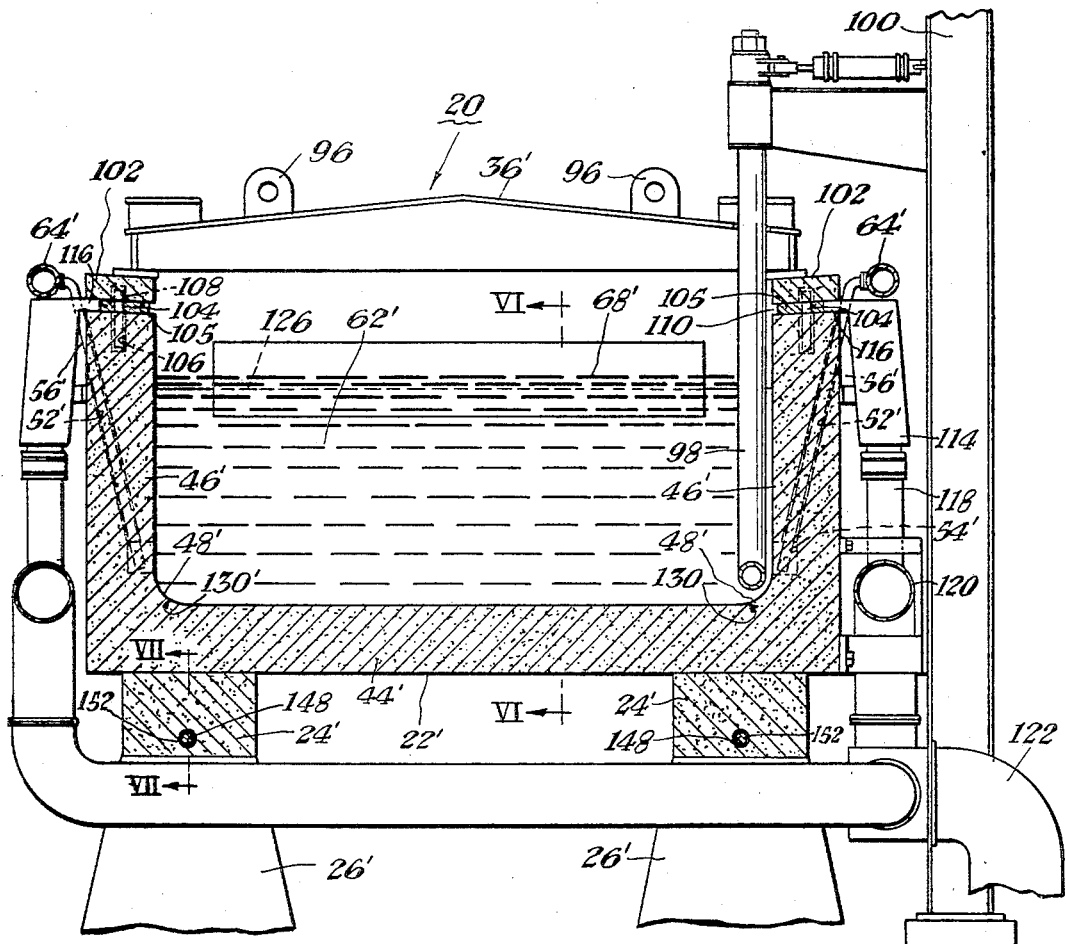
FIGURE 4 is a cross-sectional view of the apparatus as shown in FIGURE 3 and taken along reference line III—III thereof.

As better shown in FIGURES 4 and 7, and as noted previously in connection with FIGURES 1 and 2, the tank construction 22' is supported upon reinforced granite beams 24' which span a number of spaced granite piers 26'. Each of the granite beams 24' is bored to provide one or more longitudinal passages 148 extending along the length of the associated beams 24' and disposed near the bottom surface thereof. At each end of the beam 24' as better shown in FIGURE 7, the passage 148 is provided with a widened portion 150. The beams desirably are quadrilateral in cross-section, and, while shown as rectangular, can advantageously be afforded a trapezoidal configuration depending on loading and the number of tensioned cables or rods employed.

A high tensile strength steel rod or stranded cable 152 is extended through the passage 148. A retaining nut or washer 154 is threaded or otherwise secured to each end of the rod or cable 152. As shown in FIGURE 7 the tensioning device 152 is provided in the form of an elongated rod the ends of which are threaded. Suitable anchor means such as a nut is provided on one end of the rod, and nut 154 is turned upon the rod 152 until a predetermined tension is established in the rod 152. The nut 154 can be manipulated by a suitable deep socket wrench (not shown) or the like inserted into the enlarged passage portion to engage the nut 154. In those applications wherein a stranded cable (not shown) is employed a washer or other stop can be welded to one end thereof and the other end protruded from the adjacent passage portion 150 for engagement by a suitable tensioning device. When a suitable tension is established another stop member can be welded or otherwise secured in place and the outer portion of the cable burned off or otherwise severed. In any event, anchor means bearingly engage the associated beam 24' at the shoulders formed by the junctions of the passage 148 with its enlarged end portions 150.

After the reinforcing rod or cable 152 is thus tensioned, the enlarged passage openings 150 are closed with closely fitting granite plugs 156. A suitable sealant 158, such as the aforementioned silicone, is provided between the plugs 156 and the adjacent surfaces of the passage 148.

By post-tensioning the granite beams 24' in this manner, the tensile strength of the granite is increased many times to the level required when the beams 24' are loaded. Their granite plugs 156 and the aforementioned sealant prevent the entry of pickling solution and resultant corrosion of the tensioning rods or cables 152. The granite beams 24' and the granite piers or buttresses 26', therefore, provide continuous support along the entire length of the tank construction 22'. Most importantly the granite beams 24' and the granite piers 26' are not subject to attack and weakening by the aforementioned pickling solutions.

Another arrangement of our novel ventilation means for a pickling tank construction is illustrated in FIGURES 8–10 of the drawings. The pickling apparatus 20' as shown in FIGURES 8–10 utilizes a tank construction 22' which is substantially similar to that shown in the preceding figures. However, in this arrangement the offsets 50 of FIGURES 1 and 2 and the gaps 110 and railings 102 of FIGURES 3 and 4 are omitted. Instead the cover or covers 36' rest upon full-width upper edges of the side walls 46', which edges are inclined inwardly as better shown in FIGURES 9 and 10 for drainage purposes. In this arrangement the sparger passages 52' extend downwardly from the inclined upper edge surfaces of the side walls 46' from which the spargers 54' protrude for connection to header 64'. The sparging system otherwise is generally similar to that described previously.

In order to ventilate the space 160 between the cover 36' and the surface 68' of the pickling solution, a series of apertures 162 are bored in each side wall 46' of the tank construction 22' adjacent the top inclined surface thereof. As better shown in FIGURE 10 the passages 162 desirably follow the inclination of the top surfaces 164 of the side walls 46'. The sparger passages 52' (FIGURE 9) are, of course, placed intermediately of adjacent ones of the vent passages 162.

Each of the vent passages 162 is provided with a sleeve 166 the outer end of which is sealed to a suitable fitting such as elbow 168 which is in turn coupled through a flexible connector 170 to manifold 172. As better shown in FIGURE 9 the manifolds 172 on opposite sides of the tank construction 22' are connected through suitable duct work to junction box 174 and thence to exhaust header 176 or other suitable exhaust means.

If desired, each tank module 27', 28' or 30' can be provided with one or more skid bars 176, as better shown in FIGURES 8 and 9 as a further aid in preventing the steel strip or other material from contacting the bottom of the tank structure 22'. Desirably the skid bars 176 are also fabricated from granite in the exemplified application.

During the operation of our pickling apparatus, steam or other heating fluid at a suitable temperature and pressure is supplied to the header 64' and thence to the sparger tubes 54 whence it issues directly into the pickling solution 62 from the wall recesses 54. At the same time a suitable negative pressure or suction is maintained in the described exhaust or ventilation apparatus so that toxic fumes are withdrawn through the gaps 110 (FIGURES 3 and 4) or the vent passages 94 (FIGURES 1 and 2) or 162 (FIGURES 9 and 10). The cover 36 or 36' and the strip lifter 100 are manipulated at appropriate times as required by operation of the pickling apparatus and in a manner known in the art. As noted previously, the tank construction, whether formed from one or several modules are continuously supported along their lengths by an acid-impervious supporting structure including the reinforced beams 24 and buttresses 26.

FIGURE 11 illustrates a similar tank construction 180 having modified sealing means for cover 182. In the case of an elongated tank construction, for example one formed from modules as depicted above, a number of covers 182 can be supported in tandem along the length of the tank structure 180. The cover 182 in this example is rested upon foam strips 184 which can be fabricated as mentioned previously. The foam strips 184 aid in preventing the escape of noxious vapors from the tank construction 180 and, being resilient, compensate for unevenness of the mating surfaces of the cover 182 and the wall edges 190. The cover 182 may be raised and lowered also in the manner set forth previously.

In the arrangement of FIGURE 11 a liquid sealing means 186 is provided for each lateral edge of the cover 182. The liquid sealing means can, for example, be formed in conjunction with a relatively shallow groove 188 coextending with the length of the cover or covers along the upper side wall edge 190.

Each lateral edge of the cover 182 is furnished with a coextending depending flange 192. As seen from FIGURE 11 the flange 192 desirably terminates just short of the bottom surface of the groove 188. A suitable liquid such as water is placed in each groove 188 and prevents the issuance of corrosive fumes or other noxious fumes from the interior of the tank construction 180. Suitable vent means, including for example the vent passage 194, are utilized to prevent the development of positive pressures within the tank 180. The vent passage 194 can be coupled to one of the ventilating systems mentioned above. Alternatively, equivalent venting arrangements can be employed.

During the use of the tank construction 180 it is possible that the liquid contained within the groove 188 can be contaminated with pickling solution or other hazardous material from the tank 180. Therefore, the upper edge 190 of tank wall 196 is inclined inwardly such that overfilling the liquid sealing groove 188 will result in preferential leakage to the interior of the tank construction 180 rather than to the exterior thereof.

In this arrangement of our invention sparger passage 198 is disposed generally vertically and parallel to the surfaces of the side wall 196. Thus, the sparger passage 198 opens into a substantially deeper recess 200 adjacent the lower end thereof and exits from the aforementioned upper inclined edge surface 190 of the associated side wall 196. In this example, the inside end portion of recess 200 is positioned generally outwardly of a vertical plane passing through said liquid seal means 186 for proper communication with the lower end of the associated sparger passage 198. Each sparger tube 202 is provided with a number of outlet apertures 204 for emission of steam or other heating fluid, which apertures desirably are juxtaposed to the entrance 206 of the tank recess 200.

From the foregoing it will be apparent that novel and efficient forms of pickling apparatus have been disclosed herein. While we have shown and described certain presently preferred embodiments of the invention and have illustrated presently preferred methods of practicing the same, it is to be distinctly understood that the invention is not limited thereto but may be otherwise variously embodied and practiced within the scope of the following claims.

We claim:

1. Apparatus for pickling and the like, said apparatus comprising an elongated heavy-walled tank, means for supporting said tank, means for covering said tank, means for ventilating said tank, and a sparging system for heating a pickling solution contained within said tank, said sparging system including a plurality of sparging passages bored generally along the height of the side walls of said tank, each of said passages opening at one end adjacent the upper edge of the associated side wall and at its lower end into a relatively larger recess formed in the inner surface of said associated wall adjacent the bottom of said tank, and a like number of sparger tubes inserted respectively into said passages, said tubes protruding respectively into said recesses and having at least one opening therein disposed adjacent the lower end thereof and communicating directly with said recesses, and means coupled to the upper ends of said sparger tubes for conducting a heating fluid thereto.

2. The combination according to claim 1 wherein said tank is fabricated from granite, at least one buttress and weir cap are supported on the bottom of said tank, said weir cap and said buttress being fabricated from granite.

3. The combination according to claim 1 wherein said tank is fabricated from granite, an end closure is provided for each end of said tank, said closure having an integral buttress member extended into the end portion of said tank, said closure being fabricated from granite, and said closure and said buttress being sealed to the adjacent surfaces of said tank.

4. The combination according to claim 1 wherein said cover means are supported on a railing spacedly supported on the upper edge of at least one of said side walls, and said ventilating means are coupled for communication to the interior of said tank through the space between said railings and said side walls.

5. The combination according to claim 4 wherein said railings and said tank are fabricated from granite, said railing being spaced from the top surfaces of the side walls of said tank by a plurality of granite blocks spaced along the length of said railings, and said ventilating means include at least one hood having an inlet member shaped for insertion in the space between said railing and said side wall and extending along the length thereof for relatively close fitting engagement with adjacent ones of said spaced blocks.

6. The combination according to claim 1 wherein at least one of said side walls is provided with an outwardly facing offset extending along the length thereof, said cover means are supported on an extension of said side wall formed by said offset, said sparger passages open at their upper ends onto said offset, a plurality of vent passages are extended through said wall extension for communicating said offset with the interior of said tank, and said ventilating means are coupled to said vent passages.

7. The combination according to claim 6 wherein said vent passages and a bottom surface of said offset are inclined inwardly of said tank for drainage purposes and said ventilating means are at least partially supported on said offset.

8. The combination according to claim 1 wherein said tank is fabricated from granite and is supported and elevated upon at least one granite beam extending longitudinally of said tank, and a plurality of spaced granite piers are provided for supporting said beam.

9. The combination according to claim 8 wherein said granite beam is reinforced with at least one tensioned rod or cable extending through a longitudinal passage therefor adjacent the bottom surface of said beam, and means are provided for anchoring said rod or cable adjacent the ends of said passage.

10. The combination according to claim 1 wherein upper edge surfaces of said side walls are inclined inwardly of said tank for drainage purposes.

11. The combination according to claim 10 wherein said sparger passages open at their upper ends onto said inclined surfaces, and said cover means are supportable on said surfaces inwardly of said sparger passages.

12. The combination according to claim 11 wherein a plurality of vent passages are extended through at least one of said side walls adjacent the associated inclined surface, and said ventilating means are coupled to said vent passages.

13. The combination according to claim 12 wherein said vent passages are inclined toward the interior of said tank for drainage purposes.

14. Apparatus for pickling and the like, said apparatus comprising a heavily constructed tank having side and bottom walls, a plurality of sparger passages extending along the height of at least one of said side walls and opening at their upper ends adjacent the top portion of said one side wall and at their lower ends into recesses respectively formed on the inner surface of said one side wall, adjacent said bottom wall, a plurality of sparger tubes inserted respectively into said sparger passages, said tubes protruding from the upper end of said passages, means for supplying a heating fluid to the upper ends of said sparger tubes, and the lower ends of said tubes opening into said wall recesses for supplying quantities of said heating fluid to a pickling solution within said tank.

15. The combination according to claim 14 wherein the upper end openings of said sparger passages open into inclined passage means formed in said one side wall adjacent the upper edge thereof for drainage purposes.

16. The combination according to claim 14, wherein said tank is fabricated from granite, and the junctions between the side and bottom walls thereof are provided with fillets, respectively.

17. The combination according to claim 14 wherein said tank is provided with a cover, liquid seal means are formed on said cover and on the upper edge of said side walls, said liquid seal means co-extending with the lateral edges of said cover.

18. The combination according to claim 17 wherein said sparger passages and said sparger tubes are disposed substantially vertically in said one side wall and are disposed generally outwardly of said liquid seal means.

19. The combination according to claim 18 wherein said recesses extend deeply into said one side wall so as to extend outwardly of a vertical plane passing through said liquid seal means for communication with said sparger passages, and said sparger tubes are provided with a number of perforations juxtaposed to the entrance of said recess and the interior of said tank.

20. Apparatus for pickling and the like, said apparatus comprising a heavy-walled tank having side and bottom walls, cover means for said tank, railing means spacedly supported on the upper edge portion of at least one of said side walls, and ventilating hood means having inlet means inserted into said space and extending substantially along the length of said railing means.

21. The combination according to claim 20 wherein a plurality of spacing blocks for said railing means are spaced along the length thereof, and said ventilating system includes a plurality of hood structures, each of said hood structures having an inlet shaped for insertion into the space between said railing means and said one tank wall, said inlet extending along the length of said railing means into close fitting engagement with adjacent ones of said spacing blocks.

22. Apparatus for pickling and the like, said apparatus comprising a heavy-walled tank having side and bottom walls, at least one of said side walls having an outwardly facing and longitudinally extending offset adjacent the top edge thereof, cover means for said tank supportable on an extension formed by said offset and on the upper edge portion of the other of said walls, a plurality of vent passages extending through said extension adjacent the bottom surface of said offset, and ventilating means coupled to said vent passages for removing fumes of a pickling solution and the like when contained within said tank.

References Cited

UNITED STATES PATENTS

| | | | |
|---|---|---|---|
| 160,178 | 2/1875 | Jenkins et al. | 134—105 X |
| 761,418 | 5/1904 | Shupert et al. | 52—223 X |
| 1,687,617 | 10/1928 | Jewell | 134—200 X |
| 2,000,443 | 5/1935 | Hechenbleikner | 261—121 |
| 2,081,382 | 5/1937 | Piatt | 261—124 X |
| 3,058,908 | 10/1962 | Morgan | 261—121 X |

TIM R. MILES, Primary Examiner

U.S. Cl. X.R.

52—723; 134—102, 105, 200